(12) United States Patent
Hurlburt

(10) Patent No.: US 6,929,083 B2
(45) Date of Patent: Aug. 16, 2005

(54) SHIPPING/OPERATING ENVELOPES FOR UTILITY VEHICLES

(75) Inventor: Joseph C. Hurlburt, Lancaster, PA (US)

(73) Assignee: CNH America LLC, New Holland, PA (US)

( * ) Notice: Subject to any disclaimer, the term of this patent is extended or adjusted under 35 U.S.C. 154(b) by 66 days.

(21) Appl. No.: 10/277,790

(22) Filed: Oct. 23, 2002

(65) Prior Publication Data

US 2004/0079572 A1 Apr. 29, 2004

(51) Int. Cl.$^7$ .......................... B62K 15/00; B50G 9/02; B62D 33/00
(52) U.S. Cl. ................ 180/208; 280/124.116; 296/181.7
(58) Field of Search ................ 180/208, 311; 280/638, 781, 124.116, 78; 296/181.7, 35.3

(56) References Cited

U.S. PATENT DOCUMENTS

| | | | | |
|---|---|---|---|---|
| 3,580,349 A | * | 5/1971 | Brennan et al. ............ 180/208 |
| 4,892,166 A | * | 1/1990 | Gaffney ...................... 180/208 |
| 5,129,477 A | * | 7/1992 | Hurlburt ..................... 180/265 |
| 5,695,021 A | * | 12/1997 | Schaffner et al. ........... 180/208 |
| 6,402,170 B1 | * | 6/2002 | Hurlburt ..................... 280/103 |
| 6,422,641 B1 | * | 7/2002 | Coryell .................... 296/182.1 |
| 6,565,105 B2 | * | 5/2003 | Lin ..................... 280/124.113 |
| 6,793,248 B1 | * | 9/2004 | Sung .......................... 180/311 |
| 2002/0110442 A1 | * | 8/2002 | Hurlburt ..................... 414/482 |

FOREIGN PATENT DOCUMENTS

EP 1231103 A * 2/2002 ............. B60P/1/16

* cited by examiner

Primary Examiner—Lesley D. Morris
Assistant Examiner—Joselynn Y. Sliteris
(74) Attorney, Agent, or Firm—John William Stader

(57) ABSTRACT

A utility vehicle is provided with a wishbone-shaped frame having a forwardly extending stem terminating rearwardly of the front axle of the vehicle to permit the orientation of the vehicle in a shipping envelope that is significantly smaller in length than the corresponding operating envelope. The floor panel in the operator station is hinged to pivot upwardly, thereby permitting, upon the disconnection of the front axle from the frame, a rearward positioning of the front hood and front axle against the seats of the operator station. A method of configuring the utility vehicle into a compact shipping envelope is also disclosed.

10 Claims, 5 Drawing Sheets

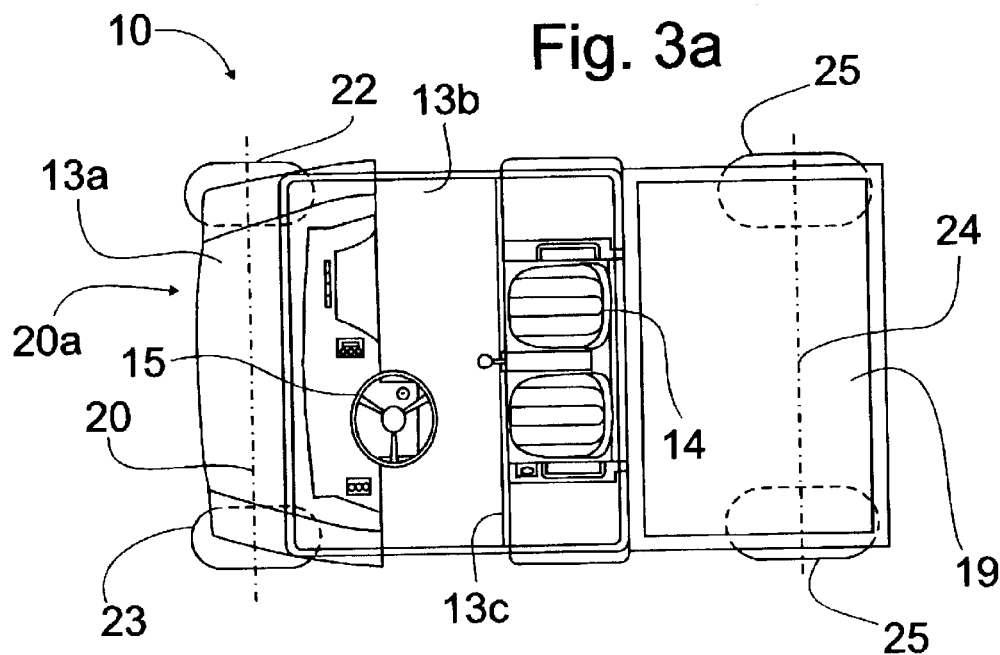
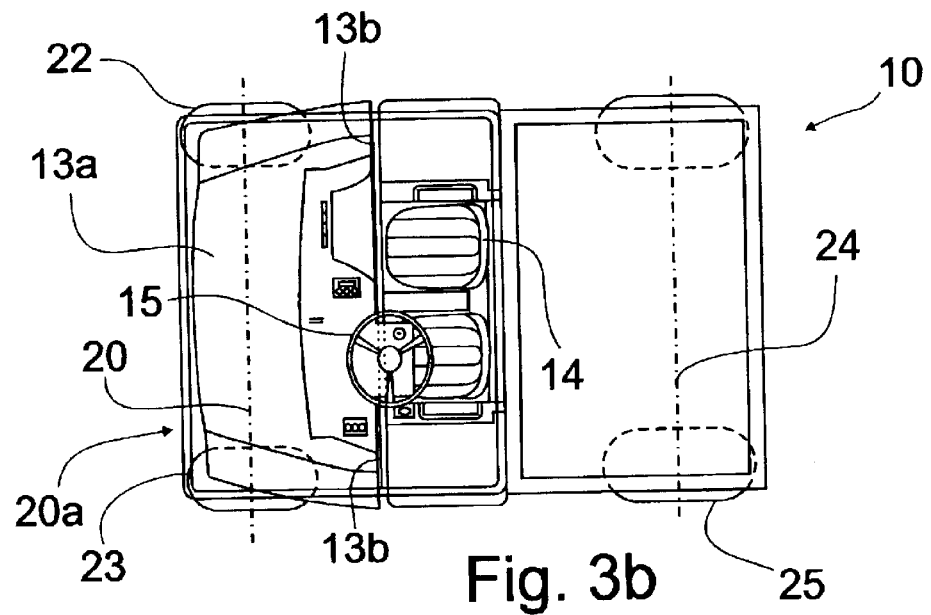

US 6,929,083 B2

SHIPPING/OPERATING ENVELOPES FOR UTILITY VEHICLES

FIELD OF THE INVENTION

The present invention relates generally to off-road motor vehicles, such as utility or recreational vehicles, and more particularly to a vehicle configuration that will enable the shipping envelope to be smaller than the operating envelope.

BACKGROUND OF THE INVENTION

Small off-road vehicles such as utility or recreational vehicles are becoming popular for recreational and other general purpose off-road usage. Such utility vehicles can be found, for example, in U.S. Pat. No. 4,706,770. These utility vehicles have found usage on golf courses and at sporting events, and are particularly adaptable for utilization on a farm. This type of flexibility, and the wide variety of uses necessitates a vehicle that is highly flexible, highly maneuverable, and the like. This demands a vehicle that will afford a high degree of maneuverability and ease of steering.

Utility vehicles can be manufactured in a two axle (four wheels) or a three axle (six wheels) configuration. The vehicles are typically shipped in the same configuration as they are operated. To minimize shipping costs, it is desirable to restrict the shipping length (i.e., shipping envelope) of the vehicle. Since these utility vehicles are normally shipped laterally on a truck bed, limitations in vehicle length are highly important as this becomes a critical factor in shipping width. The length of the vehicle is controlled by the diameter of the front tire, the clearance between the front tire and the front fender, the longitudinal length of the operator station (including the floor boards and the seat structure), and the length of the bed. Competitive advantages can be realized if each of these factors could be enlarged. For example, the front tires could be increased in size, greater fender clearance could be provided to allow for sharper steering, and a longer bed to allow for greater carrying capacity could be achieved. In addition, boarding ease and riding comfort could be improved by lengthening the operator station.

Increasing the size of these various components results in a corresponding increase in size of the operating envelope, and therefore, the shipping envelope. Accordingly, it would be desirable to provide a utility vehicle configuration in which the shipping envelope is smaller than the operating envelope.

SUMMARY OF THE INVENTION

Accordingly, an important object of the present invention is to provide a utility vehicle configuration in which the shipping envelope is smaller than the operating envelope.

It is another object of this invention to provide a utility vehicle that is easily placed into a shipping configuration.

It is yet another object of the present invention to provide a method for configuring a utility vehicle into a shipping configuration.

It is an advantage of the present invention that shipping costs are minimized.

It is another advantage of the present invention that the front axle can be easily disconnected from the frame when the utility vehicle is placed in a shipping configuration.

It is a feature of this invention that the floor panel of the utility vehicle can be raised to a vertical position to enable the front portion of the utility vehicle to be moved rearwardly to compact the shipping envelope.

It is another feature of the present invention that the frame is formed in a wishbone configuration having a forwardly extending stem and a pair of rearwardly extending legs.

It is a further feature of this invention to add a bogey beam pivotally connected at an intermediate point to said frame by a pivot assembly.

It is yet another object of this invention to provide a utility vehicle that is durable in construction, inexpensive to manufacture, carefree in maintenance, easy to assemble, and simple and effective in use.

These and other objects, features, and advantages are accomplished according to the present invention by providing a utility vehicle having a frame supported by a steering axle and terminating rearwardly of the drive axle and having a pair of steered wheels pivotally mounted thereon and a drive axle mounted to the frame having a pair of drive wheels mounted thereon, an operator station including a floor panel and a seat, and a front hood assembly. The floor panel has a forward portion pivotally connected for movement into a generally vertical orientation. The vehicle is capable of placement into a shipping configuration having a length smaller than the corresponding operating configuration by disconnecting the steering axle from the frame and moving the forward portion of the floor panel into the vertical configuration to permit movement of the front hood assembly rearwardly toward the seat.

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3a is a top plan view of the vehicle chassis depicting the operating envelope;

FIG. 3b is a top plan view of the vehicle chassis depicting the shipping envelope according to the principles of the present invention;

DETAILED DESCRIPTION OF THE PREFERRED EMBODIMENTS

Figure 1:
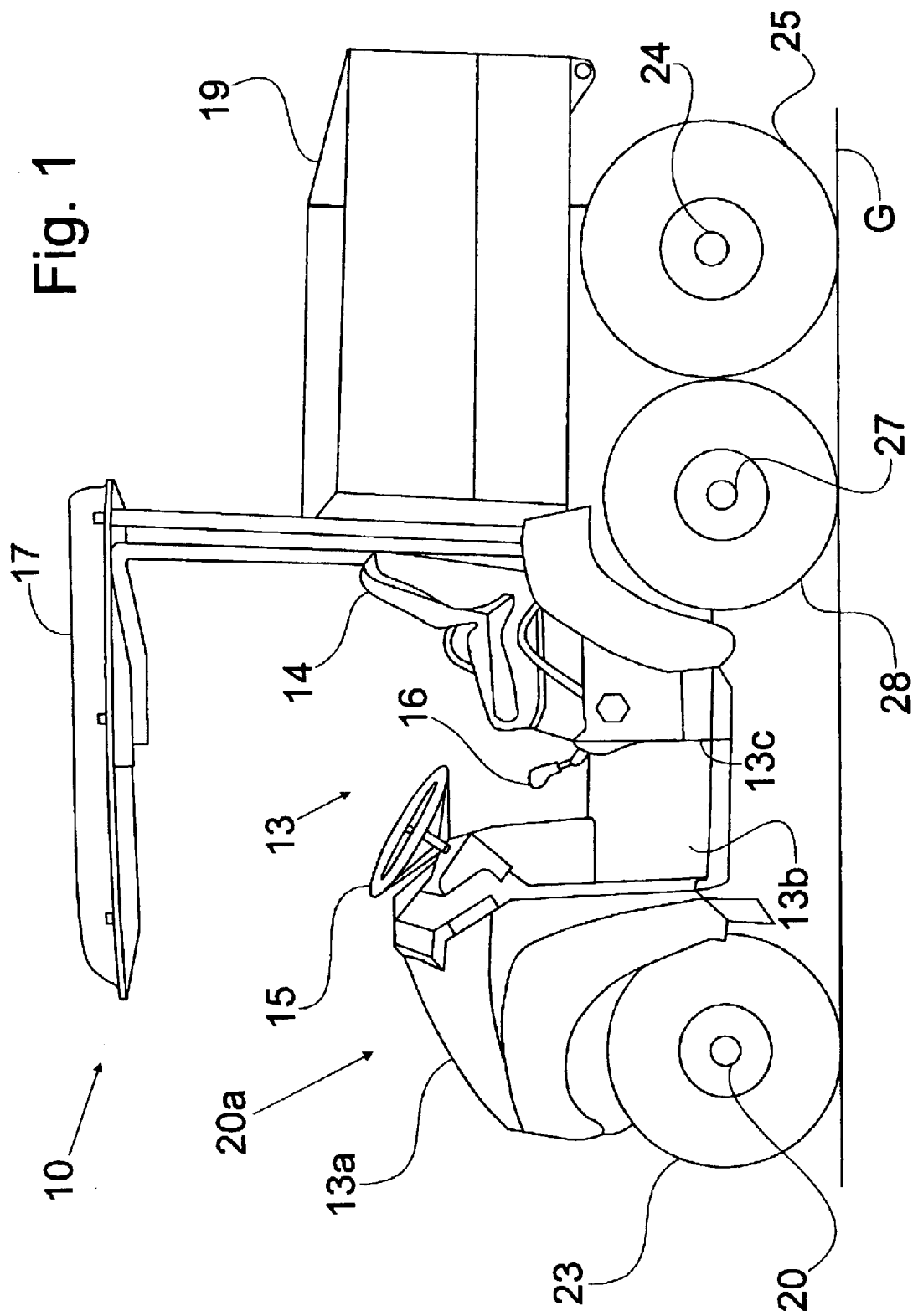
FIG. 1 is side perspective view of a utility vehicle incorporating the principles of the present invention.
Figure 2:
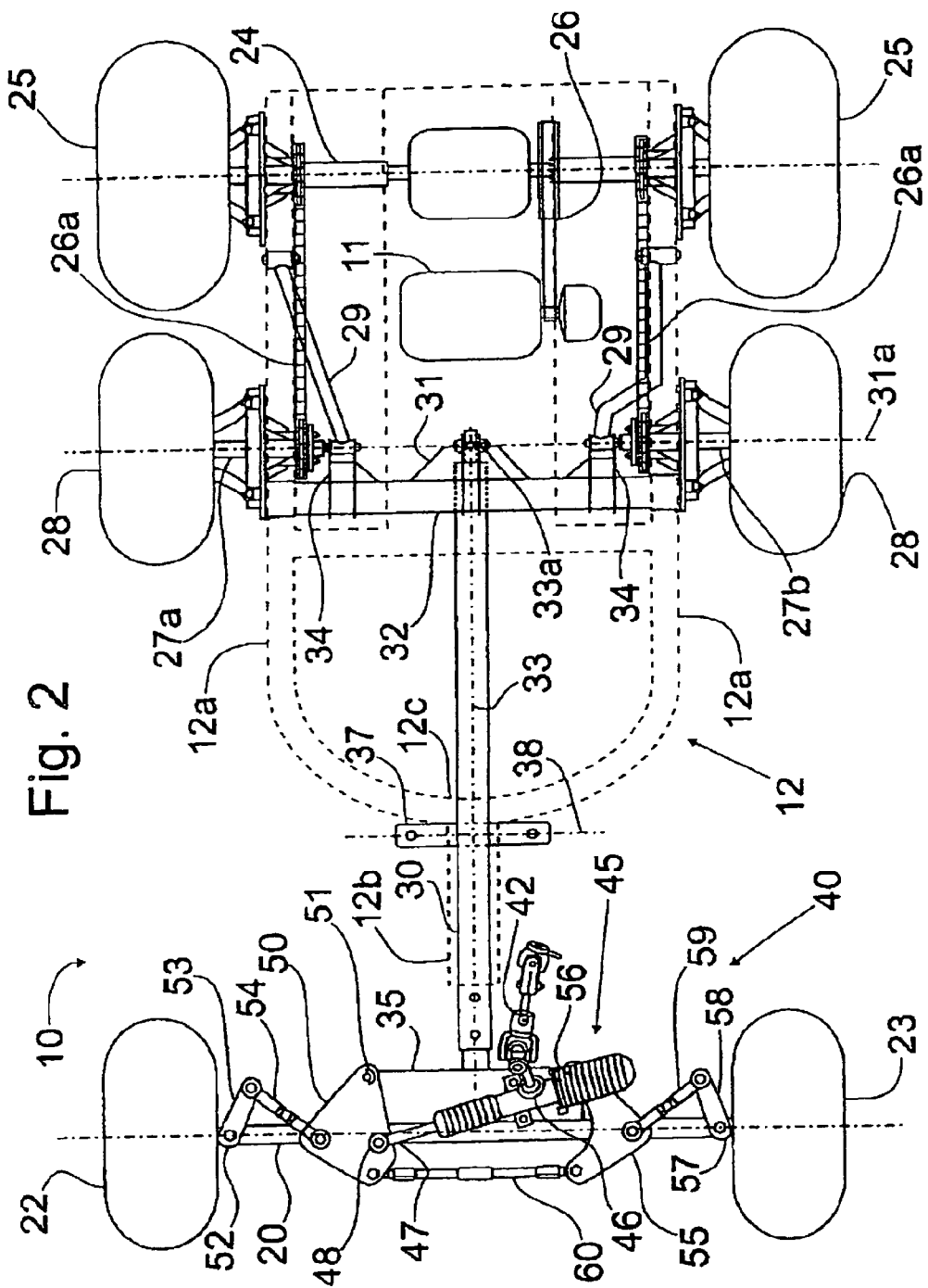
FIG. 2 is a top plan view of the frame and drive mechanism with the chassis removed for purposes of clarity.

Referring to FIGS. 1–2, a utility vehicle incorporating the principles of the present invention can best be seen.

The utility vehicle 10 includes a frame 12 supported above the ground G by a pair of steered wheels 22, 23 mounted on a front steering axle 20 and by a pair of driven wheels 25 mounted on a rear drive axle 24. In the preferred embodiment depicted in FIGS. 1–2, a middle drive axle 27 is provided with a pair of opposing support wheels 28. The frame 12 supports an operator compartment 13 including seats 14 for the comfort of the operator and control apparatus, such as a conventional steering wheel 15 and a gear shift lever 16. A throttle control (not shown) and a brake control (not shown), along with other conventional control devices, are also included within the operator compartment 13 for the control of the vehicle 10. The frame 12 also supports a load bed 19 rearwardly of the operator compartment 13 over the middle and rear drive axles 27, 24 respectively, to carry cargo over the surface of the ground G.

Referring now to FIG. 2, the frame 12 with the axles 20, 24, 27 mounted thereon can best be seen. The rear drive axle 24 is rotatably supported on the frame 12 and is powered by a drive mechanism 26 powered by an engine 11 supported by the frame 12. The middle axle 27 is pivotally supported from the frame 12 by a pair of support links 29 and is connected to the rearward end of a bogey beam 30, which will be described in greater detail below. The middle axle 27 is preferably formed as a pair of stub shafts 27a, 27b connected to said respective support links 29. A support beam 32 is pivotally mounted on a rearward end of the bogey beam 30 for oscillatory movement about a longitudinally extending pivot axis 33. The support wheels 28 on the middle axle 27 are driven by respective chain drives 26a to provide a four wheel drive capability for the vehicle 10.

The frame 12 preferably is formed in a "wishbone" configuration with the legs 12a extending rearwardly to support the rear axle 24, the bed 19, and the drive system 11. The stem 12b extends forwardly from the central bight portion 12c to support the front module 20a and the bogey beam 30. The operator station 13 would be located substantially over the central bight portion 12c. The floor panel 13b in the operator station 13 is preferably hinged at axis 13c so that the forward portion of the floor panel 13b can be pivoted upwardly into a vertical orientation to form the shipping envelopes as will be described in greater detail below.

Front axle 20 and the mounting member 35 are attached to the forward end of the bogey beam 30, and, therefore, also pivot about axis 33. The bogey beam 30 is pivotally connected to the frame 12 by a pivot assembly 37 positioned beneath the operator compartment 13 to provide an oscillation of the bogey beam 30 about the transverse pivot axis 38. Accordingly, the front steering axle 20 and the middle axle 27 generally oscillate in opposing vertical directions on opposite ends of the bogey beam 30 due to the pivotal mounting thereof by the pivot assembly 37.

The pivot assembly 37 can be formed as a simple pin assembly connecting the bogey beam 30 to the frame of the vehicle 10 to define the transverse pivot axis 38, as is shown in the drawings. The pivot assembly 37 can also suspend the bogey beam 30 from the frame 12 by providing a link (not shown) that pivotally connects at one end of the bogey beam 30 and is centrally connected to the frame 12 with the opposing end of the link being connected to a spring mechanism (not shown) that provides some resiliency between the bogey beam 30 and the frame 12. Under such a suspended bogey beam arrangement, the transverse pivot axis 38 would be located at the pivotal connection between the link (not shown) and the bogey beam 30, but would be vertically movable relative to the frame 12 about the pivotal connection between the link (not shown) and the frame 12. The spring mechanism (not shown) interconnecting the frame 12 and the link (not shown) offset forces encountered by the bogey beam 30. The location of the central pivot of the link (not shown), pivotally connecting the link to the frame 12, is positioned between the opposing ends of the link to provide the desired resiliency for the selected size of the spring mechanism.

Any load placed in the load bed 19 will be transferred to the rear axle 24 through the mounting thereof with the frame 12 and to the bogey beam 30 via the pivot assembly 37. The weight carried by the bogey beam 30 will be shared in a proportionate manner between the front steering axle 20 and the middle axle 27. The respective proportions will be determined by the location of the pivot assembly 37 along a length of the bogey beam 30. Accordingly, any load transferred to the bogey beam 30 will always be proportionately divided between the front steering axle 20 and the middle axle 27. As a result, the steering characteristics will not be impacted by any load placed into the load bed 19, as the middle axle 27 cannot overpower the front steering axle 20.

The front steering axle 20 is operatively associated with a steering mechanism 40 to effect turning movement of the steered wheels 22, 23. The steering mechanism 40 is actuated through manipulation of the steering wheel 15 by the operator through the universal connecting linkage 42. The steering mechanism 40 includes a rack and pinion assembly 45 which includes a conventional pinion (not shown) rotatably associated with the steering wheel 15 and a conventional rack 47 that is linearly movable in conjunction with the rotation of the pinion 46 in a known manner.

The rack 47 is pivotally connected to a first bell crank 50 at a first connection point 48. The first bell crank 50 is pivotally mounted on the mounting member 35 for movement about a pivot 51. The connection point 48 is positioned forwardly of the pivot 51 to effect pivotal movement of the first bell crank. The right steered wheel 22 includes a spuckle 52 having a steering arm 53 extending rearwardly therefrom. The first bell crank 50 is connected to the right steering arm 53 by a steering link 54 that extends laterally and rearwardly from the first bell crank 50 to the rearward end of the steering arm 53.

The steering mechanism 40 also includes a second bell crank 55 pivotally mounted on the mounting member 35 for movement about a pivot 56. The second bell crank 55 is connected to the first bell crank 50 by a tie rod 60 for coordinated movement therebetween. Accordingly, pivotal movement of the first bell crank 50 is transferred to the second bell crank 55 through connection with the tie rod 60. The left steered wheel 23 includes a spuckle 57 having a steering arm 58 extending rearwardly therefrom. The second bell crank 55 is connected to the left steering arm 58 by a steering link 59 that extends laterally and rearwardly from the second bell crank 55 to the rearward end of the steering arm 58. Accordingly, the left and right steered wheels 22, 23 are steered in concert with one another in response to a manipulation of the steering wheel 15 by the operator.

The support beam 32 at the rear end of the bogey beam 30 has the stub axles 27a, 27b mounted directly to the laterally opposing ends of the support beam 32. The support beam 32 also has a pair of mounting brackets 34 projecting rearwardly therefrom interiorly of the stub shafts 27a, 27b to pivotally connect with the support links 29. The support links 29 pivotally interconnect the frame 12 just forward of the rear drive axle 24 and the mounting brackets 34 on the support beam 32. While the drawings depict the support links 29 connected to the frame 12 and the rear drive axle 24 fixed to the frame 12, an alternative configuration can suspend the rear drive axle 24 from the frame 12 such that the rear drive axle 24 is vertically movable relative to the frame 12. In such a configuration, the support links 29 would preferably be mounted to the rear drive axle 24 to be vertically movable therewith, but pivotable about an axis that is not coincidental with the axis of the rear drive axle 24. Furthermore, the pivotal connection between the support links 29 and either the frame 12 or the rear drive axle 24 will be positionally adjustable in a fore-and-aft direction to provide for adjustment of the tension in the chain drive mechanism 26a.

Support beam 32 is also connected to a central support bracket 31 which, in turn, is connected to the rearward end of the bogey beam 30 by a ball joint 33a defining the oscillation axis 33, which permits the middle axle 27 to oscillate about a longitudinally extending axis 33 and permits the middle axle 27 to follow ground undulations. The central support bracket 31 also defines a pivotal connection between the bogey beam 30 and the support beam 32 such that the support beam 32, which is fixed to the central support bracket 31, is free to pivot about a bolt defining a transversely extending pivot axis 31a that is eccentric with respect to the transverse axis of the middle axle 27. Accordingly, the middle axle 27 is capable of simultaneous pivotal movement about the transverse axis 31a and the pivotal connections between the support links 29 and the mounting brackets 34. Preferably, the pivotal connection between the support links 29 and the mounting brackets 34 are in alignment with the stubs shafts 27a, 27b defining the middle axle 27. The transverse pivot axis 31a is located below the line of the middle axle 27.

The pivotal connection of the support links 29 to the frame 12 (or alternatively to the rear drive axle 24) is preferably formed as an assembly that is longitudinally movable to control the tension in the chain drive mechanism 26a. One skilled in the art will readily recognize that a fore-and-aft movement of the support link 29 will cause pivotal movement of the support beam 32 about the transverse pivot axis 31a carried by the rearward-end of the bogey beam 30. Accordingly, the normal operative position of the support beam 32 will be at an orientation above the bogey beam 30 to allow for wear adjustment of the chain mechanism 26a.

Figure 4A:
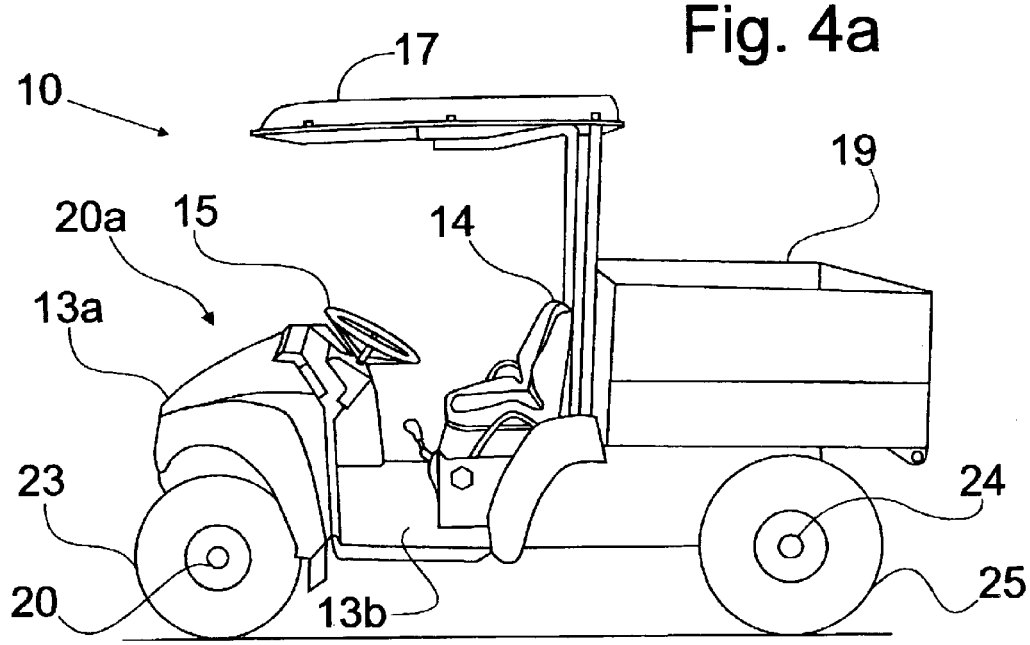
FIG. 4a is a side elevational view of a utility vehicle depicting the operating envelope.
Figure 4B:
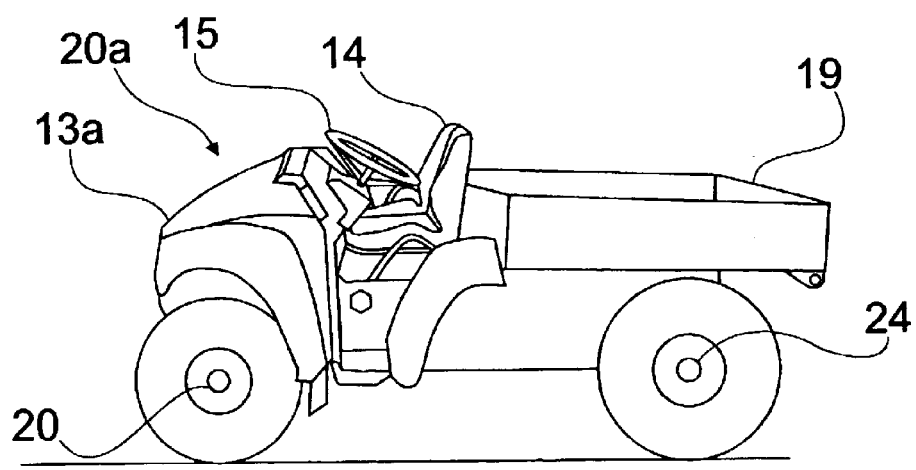
FIG. 4b is a side elevational view of a utility vehicle depicting the shipping envelope.
Figure 5:
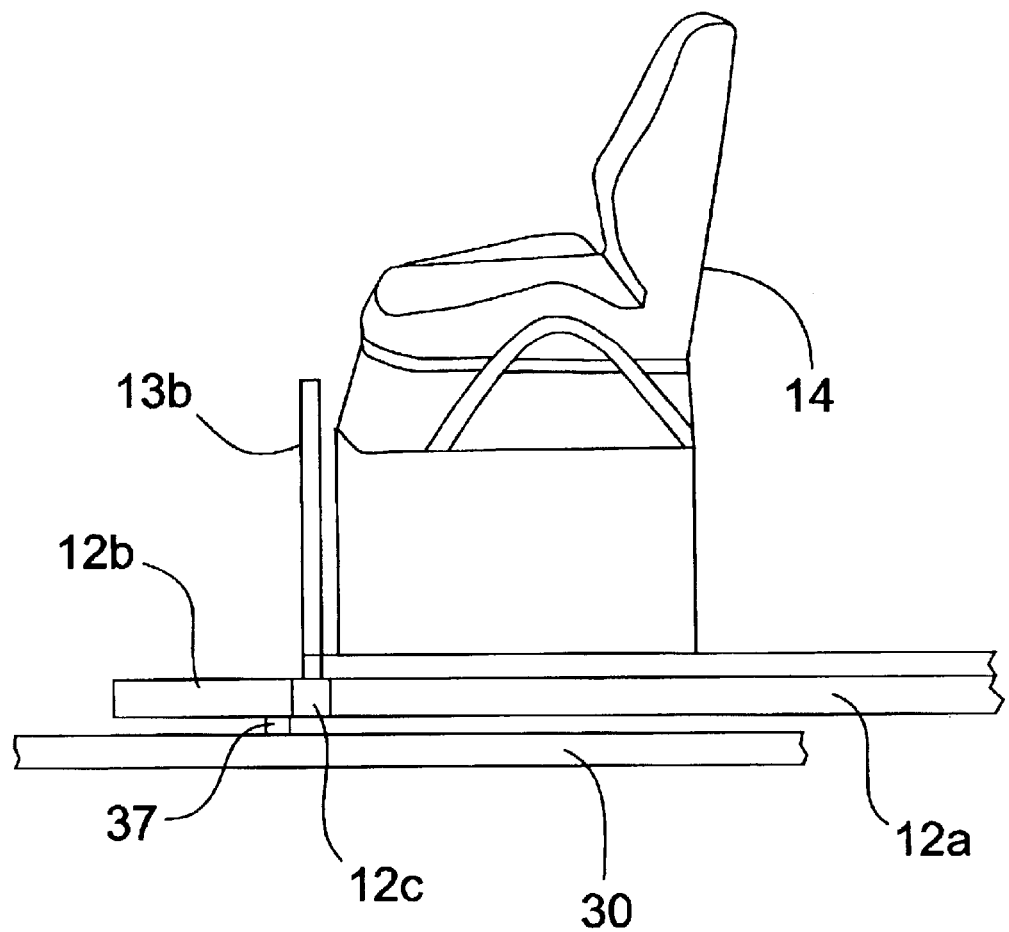
FIG. 5 is a schematic side elevational view of the operator station configured in the shipping envelope.

Referring now to FIGS. 3a–5, the differences between the operating envelope and the shipping envelope can best be seen. By raising the forward portion of the floor panel 13b to a vertical position, as best seen in FIG. 5, and disconnecting the front hood assembly 13a from the frame 12, and the steering axle 20 from the bogey beam 30, the front module 20a of the utility vehicle 10, including the front hood assembly 13a and the steering axle 20, can be moved rearwardly to compact the shipping envelope, as is depicted in FIGS. 3b and 4b. In this shipping configuration, the front module 20a of the utility vehicle 10 could be temporarily connected to the remainder of the vehicle, or even shipped separately in a different crate. As can be seen in a comparison between FIGS. 3a and 3b, as well as in a comparison of FIGS. 4a and 4b, the overall length of the operating configuration of the utility vehicle 10, as seen in FIGS. 3a and 4a is significantly larger than the overall length of the utility vehicle 10 when placed into the compact shipping configuration, as seen in FIGS. 3b and 4b. As illustrated in FIGS. 4a and 4b, the roof assembly 17 could also be detached for shipping purposes.

Once received by the dealer, the front module 20a of the utility vehicle 10 would be reconnected to the remaining portion of the utility vehicle 10 by reattaching the steering axle 20 to the bogey beam 30, reattaching the front hood 13a to the frame 12, and lowering the floor panel 13b. The roof assembly 17 would be reconnected and the operating envelope, as depicted in FIGS. 3a and 4a, would be re-established.

In alternative embodiments, for example, the floor panel 13b can be overlapping so as to telescope. Such an embodiment would permit the front module 20a to be moved rearwardly toward the seat 14 and place the utility vehicle 10 in the shipping configuration. In another embodiment of the invention, the floor panel 13b can be fully detachable from the frame 12, and could be shipped either in the bed 19 of the utility vehicle 10 or could be shipped separately from the utility vehicle 10. In yet another embodiment of the invention, the floor panel 13b is fixed to the frame 12 and the front module is configured to slide rearwardly over the top of the floor panel 13b toward the seat 14, thus placing the utility vehicle 10 into a compact shipping configuration having an overall length that is significantly less than the normal operation configuration.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. In a utility vehicle having a frame, an operator station including a floor panel and a seat supported on said frame, a front module including a steering axle and a front hood assembly connected to said frame, and a longitudinally extending bogey beam pivotally connected at an intermediate point to said frame, said bogey beam having a forward end connected to said steering axle and an opposing rearward end, said intermediate point being positioned between said forward and rearward ends of said bogey beam the improvement comprising:

said steering axle being disconnectable from the bogey beam to move rearwardly from an operating configuration to a shipping configuration that has an overall length that is smaller than the corresponding overall length in said operating configuration.

2. The utility vehicle of claim 1, wherein at least a portion of said floor panel is movable to place said utility vehicle into and out of said shipping configuration.

3. The utility vehicle of claim 2, wherein said floor panel includes a portion pivotally connected for movement into a generally vertical orientation, said vehicle being capable of placement into said shipping configuration by disconnecting said steering axle from said bogey beam and moving said portion of said floor panel into said vertical orientation to permit movement of the front hood assembly rearwardly toward said seat.

4. The utility vehicle of claim 1, wherein said frame is formed in a wishbone configuration having a forwardly extending stem terminating rearwardly of said steering axle and a pair of legs extending rearwardly from said stem.

5. The utility vehicle of claim 1, wherein said utility vehicle further includes a detachable roof assembly, said roof assembly being removed when said utility vehicle is placed into said shipping configuration.

6. A method of configuring a utility vehicle having a frame, an operator station including a floor panel and a seat supported on said frame, a front module including a steering axle and a front hood assembly connected to said frame, and a longitudinally extending bogey beam having a forward end and an opposing rearward end, said bogey beam pivotally connected at an intermediate point to said frame with said intermediate point being positioned between said forward and rearward ends of said bogey beam and said bogey beam having a forward end connected to said steering axle, into a shipping configuration comprising the steps of:

disconnecting said steering axle from said bogey beam to permit rearward movement of said front module relative to said frame; and moving said front module rearwardly toward said seat to reduce an overall length of said vehicle for the purpose of shipment.

7. The method of claim 6 further comprising the step of moving at least a portion of aid floor panel to place said utility vehicle into and out of said shipping configuration.

8. The method of claim 7, wherein the step of moving at least a portion of said floor panel includes the step of:

pivoting a portion of said floor panel for movement into a generally vertical orientation, said step of moving said front module being operable to place said front module against said vertically oriented floor panel.

9. The method of claim 6 further comprising the step of detaching a roof assembly from said frame to convert said utility vehicle into said shipping configuration.

10. The method of claim 9, wherein the step of detaching said roof assembly occurs prior to said step of moving said front module.

* * * * *